United States Patent Office 3,836,539
Patented Sept. 17, 1974

3,836,539
OXADIAZOLONE DERIVATIVES
Roger Boesch, Vitry-sur-Seine, France, assignor to Rhone-Poulence S.A., Paris, France
No Drawing. Filed Sept. 6, 1972, Ser. No. 286,778
Claims priority, application France, Sept. 9, 1971, 7132587
Int. Cl. C07d 85/54
U.S. Cl. 260—307 A
9 Claims

ABSTRACT OF THE DISCLOSURE 1,3,4-Oxadiazol-2-one derivatives carrying in the 5-position an alkyl or cycloalkyl substituent and in the 4-position a phenyl substituent, which optionally carries in the 2- and 4- positions halogen or alkyl substituents and carries in the 5-position a substituent —$OCHR_3R_4$ (wherein $R_3$ is hydrogen, alkyl or alkoxy, and $R_4$ is carboxy, alkoxycarbonyl, hydroxymethyl, alkoxymethyl or a carbamoyl group of formula —$CONR_5R_6$ in which $R_5$ is hydrogen, alkyl, alkenyl or alkoxy and $R_6$ is hydrogen, alkyl or alkenyl) are new compounds useful as herbicides.

This invention relates to new oxadiazolone derivatives possessing, in particular, herbicidal activity.

As a result of research and experimentation it has been found that the new oxadiazolone derivatives of the general formula:

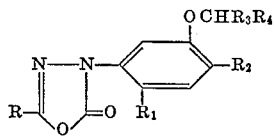

I wherein R represents an alkyl radical containing 1 to 4 carbon atoms or a cycloalkyl radical containing 3 to 6 carbon atoms, $R_1$ and $R_2$ are the same or different and each represents a hydrogen or halogen (preferably chlorine) atom or an alkyl radical containing 1 to 4 carbon atoms, $R_3$ represents a hydrogen atom, or an alkyl (preferably methyl) or alkoxy radical each containing 1 to 4 carbon atoms, and $R_4$ represents a carboxy radical, an alkoxycarbonyl radical in which the alkyl moiety contains 1 to 4 carbon atoms, a hydroxymethyl radical, an alkoxymethyl radical in which the alkyl moiety contains 1 to 4 carbon atoms, or a carbamoyl group —$CONR_5R_6$, in which $R_5$ represents a hydrogen atom or an alkyl radical containing 1 to 4 carbon atoms, an alkenyl radical containing 2 to 4 carbon atoms (e.g. allyl) or an alkoxy radical containing 1 to 4 carbon atoms, and $R_6$ represents a hydrogen atom or an alkyl radical containing 1 to 4 carbon atoms or an alkenyl radical containing 2 to 4 carbon atoms, possess useful herbicidal properties.

The oxadiazolone derivatives of general formula I show herbicidal activity principally against monocotyledonous (e.g. grass) weeds, and are also usefully active against dicotyledonous (i.e. broadleafed) weeds, on both pre-emergence and post-emergence application. They can be used to control weeds such as *Alopecurus agrestis, Avena fatua, Setaria faberii, Digitaria sp., Sinapis arvensis, Amaranthus retroflexus, Chenopodium album* and *Rumex crispus*, and can be so used amongst useful food crops, for example wheat, barley and peas. Their herbicidal activity is exerted at dosages of between 0.25 kg. and 5 kg./hectare.

Preferred compounds of general formula I are those in which R represents a t-butyl group, $R_1$ and $R_2$ each represent a halogen (preferably chlorine) atom, $R_3$ represents an alkyl radical containing 1 to 4 carbon atoms (preferably methyl), and $R_4$ represents a carboxy radical, an alkoxycarbonyl radical in which the alkyl moiety contains 1 to 4 carbon atoms (preferably methoxycarbonyl or ethoxycarbonyl), a hydroxymethyl radical, an alkoxymethyl radical in which the alkyl moiety contains 1 to 4 carbon atoms (preferably methoxymethyl), or a carbamoyl group —$CONR_5R_6$ in which $R_5$ represents an alkyl or alkoxy radical containing 1 to 4 carbon atoms (preferably methyl, ethyl or methoxy) and $R_6$ represents a hydrogen atom or an alkyl radical containing 1 to 4 carbon atoms (preferably methyl or ethyl), because of their outstanding herbicidal properties. Of particular importance are:

3-[2,4-dichloro-5-(1-carboxy-ethoxy)-phenyl]-5-t-butyl-1,3,4-oxadiazol-2-one,

3-[2,4-dichloro-5-(1-hydroxymethyl-ethoxy)-phenyl]-5-t-butyl-1,3,4-oxadiazol-2-one, 3-[2,4-dichloro-5-(1-dimethylcarbamoyl-ethoxy)-phenyl]-5-t-butyl-1,3,4-oxadiazol-2-one, and 3-[2,4-dichloro-5-(1-N-methoxy-N-methylcarbamoyl-ethoxy)-pheny]-5-t-butyl-1,3,4-oxadiazol-2-one.

According to features of the invention, the oxadiazolone derivatives of general formula I are prepared by application of one of the processes identified hereafter as A, B, C or D.

(A) The compounds of the general formula I, wherein R, $R_1$, $R_2$ and $R_3$ are as hereinbefore defined and $R_4$ represents a carboxy, alkoxycarbonyl or alkoxymethyl radical, are prepared by reacting a compound of the general formula:

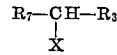

II (wherein $R_3$ is as hereinbefore defined, X represents the acid residue of a reactive ester such as a halogen atom, and $R_7$ represents a carboxy radical optionally salified by an alkali metal atom, or an alkoxycarbonyl or alkoxymethyl radical in which the alkyl moiety contains 1 to 4 carbon atoms) with an oxadiazolone derivative of the general formula:

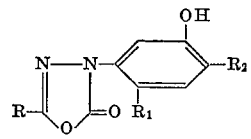

III wherein R, $R_1$ and $R_2$ are as hereinbefore defined.

The reaction is generally carried out by heating the reactants, optionally in an organic solvent, at the reflux temperature of the reaction mixture and in the presence of a basic condensation agent and optionally in the presence of an alkali metal iodide, for example sodium iodide.

(B) The compounds of general formula I, wherein R, $R_1$, $R_2$ and $R_3$ are as hereinbefore defined and $R_4$ represents a carboxyl radical, are also prepared by acid or alkaline hydrolysis, according to methods known *per se*, of a compound of general formula I wherein $R_4$ represents an alkoxycarbonyl radical in which the alkyl moiety contains 1 to 4 carbon atoms. By the term "methods known *per se*" is meant methods heretofore used or described in the literature.

(C) The compounds of general formula I, wherein R, $R_1$, $R_2$ and $R_3$ are as hereinbefore defined and $R_4$ represents a —$CONR_5R_6$ group in which $R_5$ and $R_6$ are as hereinbefore defined, are prepared by reacting a compound of the general formula:

IV (wherein $R_5$ and $R_6$ are as hereinbefore defined) with an acid halide of the general formula:

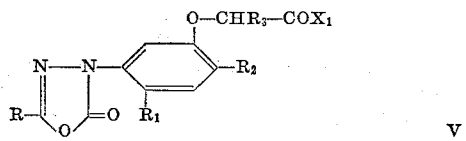

V wherein R, $R_1$, $R_2$ and $R_3$ are as hereinbefore defined), and $X_1$ represents a halogen (preferably chlorine) atom.

The reaction is generally carried out in an organic solvent in the presence of an excess of the compound of general formula IV.

The acid halides of the general formula V can be obtained, for example, by reacting thionyl chloride with a compound of general formula I wherein R, $R_1$, $R_2$ and $R_3$ are as hereinbefore defined and $R_4$ represents a carboxy radical.

(D) The compounds of general formula I, wherein R, $R_1$, $R_2$ and $R_3$ are as hereinbefore defined and $R_4$ represents a hydroxymethyl radical, are prepared by the reduction of a compound of general formula I in which $R_4$ represents an alkoxycarbonyl radical, according to methods known per se for the reduction of an ester to an alcohol without affecting the rest of the molecule. For example, lithium borohydride in anhydrous tetrahydrofuran can be used as the reduction means.

The oxadiazolone derivatives of general formula III can be obtained by reacting phosgene with a hydrazide of the general formula:

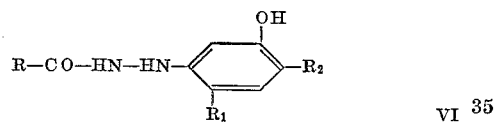

VI (wherein R, $R_1$ and $R_2$ are as hereinbefore defined), or by hydrolysis in an acid medium of a compound of the general formula:

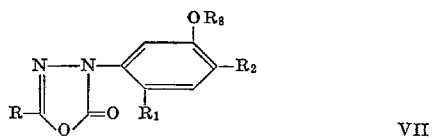

VII wherein R, $R_1$ and $R_2$ are as hereinbefore defined, and $R_8$ represents an alkyl radical containing 1 to 4 carbon atoms.

According to a further feature of the present invention, there are provided herbicidal compositions containing, as the active ingredient, at least one oxadiazolone derivative of general formula I in association with one or more diluents compatible with the oxadiazolone(s) and suitable for use in agricultural herbicidal compositions. These compositions can optionally contain other compatible pesticides, such as herbicides, insecticides or fungicides. Preferably the compositions contain between 0.005% and 80% by weight of oxadiazolone compound(s).

The compositions may be solid if there is employed a powdered solid compatible diluent such as talc, calcined magnesia, kieselguhr, tricalcium phosphate, powdered cork, adsorbent charcoal, or a clay such as kaolin or bentonite. These solid compositions are preferably prepared by grinding the oxadiazolone compound with the solid diluent, or by impregnating the solid diluent with a solution of the oxadiazolone compound in a volaitle solvent, evaporating the solvent, and if necessary grinding the product so as to obtain a powder.

Instead of a solid diluent, there may be used a liquid in which the oxadiazolone compound is dissolved or dispersed. The compositions may thus take the form of suspensions, emulsions or solutions in organic or aqueous-organic media, for example aromatic hydrocarbons such as toluent or xylene, ketones such as acetophenone, or mineral, animal or vegetable oils, or mixtures of these diluents. The compositions in the form of suspensions, emulsions of solutions may contain wetting, dispersing or emulsifying agents of the ionic or non-ionic type, for example sulphoricinoleates, quaternary ammonium derivatives or products based on condensates of ethylene oxide, such as the condensates of ethylene oxide with octylphenol, or fatty acid esters of anhydrosorbitols which have been rendered soluble by etherification of the free hydroxyl groups by condensation with ethylene oxide. It is preferable to use agents of the non-ionic type because they are not sensitive to electrolytes. When emulsions are required, the oxadiazolones may be used in the form of self-emulsifying concentrates containing the active substance dissolved in the emulsifying agent or in a solvent containing an emulsifying agent compatible with the oxadiazolone and solvent, a simple addition of water to such concentrates producing compositions ready for use.

According to another feature of the invention, a method of controlling the growth of monocotyledonous or dicotyledonous weeds at a locus comprises applying to the locus a herbicidally-effective quantity of at least one oxadiazolone derivative of general formula I. The oxadizolone may be applied selectively to a crop-growing area, the amount of applied oxadiazolone then being sufficient for control of the weeds, e.g. grasses, but insufficient to cause substantial damage to the crop. The dosage can vary in accordance with the nature of the weed or weeds to be controlled, the crop and the desired effect. In general, taking into account these factors, dosages of oxadiazolone compound(s) of 0.25 to 5 kg. per hectare give good results, for example in the control of foxtail and wild oats in wheat and barley crops.

The following Examples illustrates the preparation of oxadiazone derivatives of the present invention.

EXAMPLE 1

A mixture of 3 - (2,4 - dichloro - 5 - hydroxy - phenyl)- 5 - t - butyl - 1,3,4 - oxadiazol - 2 - one (117 g.), methyl 2-bromopropionate (67.5 g.), sodium iodide (2.9 g.) and potassium carbonate (48.5 g.) in acetonitrile (585 cc.) is heated under reflux with stirring for 6 hours 45 minutes. After cooling, the inorganic salts are filtered off and the organic solution is concentrated to dryness under reduced pressure (20 mm. Hg) at 50° C. The residue is taken up in methylene chloride (300 cc.) and the methylene chloride solution is washed with water (3 × 200 cc.) and then dried over sodium sulphate. The solvent is evaporated under reduced pressure (20 mm. Hg) at 50° C. and the residual solid is then recrystallised from isopropanol to give 3 - [2,4 - dichloro - 5 - (1 - methoxy - carbonylethoxy) - phenyl] - 5 - t - butyl] - 1,3,4 - oxadiazol - 2- one (136.5 g.) melting at 110° C.

3 - (2,4 - Dichloro - 5 - hydroxy - phenyl) - 5 - t- butyl - 1,3,4 - oxadiazol - 2 - one (m.p. 132° C.), used as starting material can be prepared either:

(a) By cyclisation, using phosgene, of 1-trimethylacetyl-2 - (2,4 - dichloro - 5 - hydroxy - phenyl) - hydrazine (m.p. 222° C.) in a refluxing mixture of toluene and dioxan.

[1-Trimethylacetyl-2-(2,4-dichloro-5-hydroxy-phenyl)-
  hydrazine can be obtained by reacting trimethylacetic
  anhydride with 2,4-dichloro-5-hydroxyphenyl-hydrazine
  (m.p. 215° C.) in dimethylformamide in the presence
  of trimethylacetic acid and water.]
[2,4-Dichloro-5-hydroxyphenyl-hydrazine can be
  prepared from 2,4-dichloro-5-hydroxyaniline (m.p.
  137° C.) by diazotisation followed by reduction of the
  diazonium salt with stannous chloride], or (b) By hydrolysis, by means of sulphuric acid ($d=1.83$), of 3 - (2,4 - dichloro - 5 - isopropoxy-phenyl)- 5 - t - butyl - 1,3,4 - oxadiazol - 2 - one (m.p. 90° C.), which is itself obtained according to the process which is described in the Specification of Belgian Pat. No. 675,562.

Following the same procedure and using appropriate starting materials of general formulae II and III, the following products are obtained:

3-[2,4-dichloro-5-(1-methoxycarbonyl-ethoxy)-phenyl]-5-ethyl-1,3,4-oxadiazol-2-one, m.p. 58–59° C.;
3-[2-chloro-5-(1-methoxycarbonyl-ethoxy)-phenyl]-5-t-butyl-1,3,4-oxadiazol-2-one, m.p. 132° C.;
3-[2,4-dichloro-5-(1-methoxycarbonyl-ethoxy)-phenyl]-5-isopropyl-1,3,4-oxadiazol-2-one, m.p. 73° C., and
3-[2-chloro-4-methyl-5-(1-methoxycarbonyl-ethoxy)-phenyl]-5-t-butyl-1,3,4-oxadiazol-2-one, m.p. 90° C.

EXAMPLE 2

A solution of 3 - [2,4 - dichloro - 5 - (1 - methoxycarbonyl - ethoxy) - phenyl] - 5 - t - butyl - 1,3,4-oxadiazol-2-one (7.5 g.), hydrochloric acid ($d=1.18$; 15.5 cc.) and dioxan (150 cc.) is heated at 80° C. for 24 hours. After cooling, the solution is poured into water (750 cc.) and the precipitate which appears is filtered off, washed with water (10× 25 cc.) and then poured into a 10% (w./v.) solution of potassium bicarbonate (200 cc.). After stirring for 30 minutes, decolourising charcoal (2 g.) is added to the slightly cloudy solution, and then stirring is continued for a further 15 minutes. After filtration, the filtrate is acidified to pH 1 with hydrochloric acid ($d=1.18$). The precipitate which appears is filtered off, washed with water (10× 20 cc.) and then dried under reduced pressure (0.5 mm. Hg) at 20° C. to give 3-[2,4-dichloro - 5 - (1 - carboxy - ethoxy) - phenyl] - 5 - t-butyl-1,3,4-oxadiazol-2-one (5.2 g.) melting at 171° C.

Following the same procedure and using appropriate 3 - [5 - (1 - alkoxycarbonyl - alkoxy) -phenyl] - 5 - t-butyl-1,3,4-oxadiazol-2-one starting materials, the following products are obtained:

3-(2,4-dichloro-5-carboxymethoxy-phenyl)-5-t-butyl-1,3,4-oxadiazol-2-one, m.p. 179° C.;
3-[2-chloro-5-(1-carboxy-ethoxy)-phenyl]-5-t-butyl-1,3,4-oxadiazol-2-one, m.p. 159° C., and
3-[2-chloro-4-methyl-5-(1-carboxy-ethoxy)-phenyl]-5-t-butyl-1,3,4-oxadiazol-2-one, m.p. 160° C.

EXAMPLE 3

A solution of lithium borohydride [obtained from potassium borohydride (1.5 g.), lithium chloride (1.3 g.) and anhydrous tetrahydrofuran (60 cc.)] is added, over the course of 30 minutes, under nitrogen, to a solution of 3 - [2,4 - dichloro - 5 - (1 - methoxycarbonyl - ethoxy)-phenyl] - 5 - t - butyl - 1,3,4 - oxadiazol - 2 - one (19.5 g.) in anhydrous tetrahydrofuran (40 cc.), kept at 20° C. Stirring is continued for 1 hour at 20° C. and then water (50 cc.) is added to the reaction mixture whilst cooling it in an ice-water bath. The mixture is extracted with anaesthetic grade diethyl ether (2× 50 cc.) and the ether solution is washed with water (3× 50 cc.). After drying over sodium sulphate, the solvent is evaporated under reduced pressure (20 mm. Hg) at 55° C. The residual oil (18 g.) is purified by chromatography on a column. 3 - [2,4-Dichloro - 5 - (1 - hydroxymethyl - ethoxy) - phenyl]-5 - t -butyl - 1,3,4 - oxadiazol - 2 - one (7 g.), melting at 76–78° C. after crystallisation from heptane, is thus obtained.

EXAMPLE 4

Following the procedure of Example 1 but starting with 3 - (2,4 - dichloro - 5 - hydroxy - phenyl) - 5 - t - butyl-1,3,4 - oxadiazol - 2 - one (21.2 g.), ethyl chloroacetate (8.6 g.), potassium carbonate (9.7 g.), sodium iodide (0.5 g.) and acetonitrile (106 cc.), 3 - (2,4 - dichloro - 5-ethoxycarbonylmethoxy - phenyl) - 5 - t - butyl - 1,3,4-oxadiazol-2-one (12 g.), melting at 99–100° C., is obtained after recrystallisation of the product from diisopropyl ether.

EXAMPLE 5

3 - (2,4 - Dichloro - 5 - hydroxy - phenyl) - 5 - t - butyl-1,3,4 - oxadiazol - 2 - one (10.5 g.), methyl α - chloro-α-methoxy-acetate (4.8 g.), triethylamine (5.2 cc.) and anhydrous benzene (40 cc.) are heated under reflux for 5 hours 30 minutes. After cooling, the precipitate of triethylamine hydrochloride which has formed is dissolved by addition of water (35 cc.). The organic phase is decanted, washed with water (35 cc.), dried over sodium sulphate and then concentrated to dryness under reduced pressure (20 mm. Hg) at 40° C. The oily residue is dried to constant weight under reduced pressure (0.5 mm. Hg.) at 60° C. Methyl α - methoxy - α - [2,4 - dichloro - 5 - (5-t - butyl - 1,3,4 - oxadiazol - 2 - one - 3 - yl) - phenoxy]-acetate (12 g.) is thus obtained in the form of an oil.

Analysis.—Calculated (percent): N, 6.91; Cl, 17.50. Found (percent): N, 6.55; Cl, 17.25.

Methyl α-chloro-α-methoxyacetate (b.p. 72–74° C./22 mm. Hg), used as starting material, can be prepared according to Gross and Freiberg, Ber. 99, 3267 (1966).

EXAMPLE 6

A solution (23 cc.) of dimethylamine in benzene (99 g. of dimethylamine per litre) is added, at about 20° C. and with stirring, to a solution in benzene of 3-[2,4-dichloro-5-(1-chlorocarbonyl-ethoxy)-phenyl] - 5 - t - butyl-1,3,4-oxadiazol-2-one (23 mM.) [obtained from 3-[2,4-dichloro-5-(1-carboxy-ethoxy)-phenyl]-5-t - butyl - 1,3,4-oxadiazol-2-one (10 g.; prepared as described in Example 2) and thionyl chloride (5 g.)]. After 2.5 hours, water (100 cc.) is poured into the reaction mixture. The aqueous-organic mixture is stirred for 10 minutes and then the organic layer is decanted and washed successively with water (100 cc.), a 10% (w./v.) solution of potassium bicarbonate (100 cc.) and water (100 cc.).

After drying and evaporating the solvent, a residue (10.5 g.), melting at 120° C., is obtained. After recrystallisation from cyclohexane, 3-[2,4-dichloro-5-(1-dimethylcarbamoyl-ethoxy)-phenyl]-5-t-butyl - 1,3,4 - oxadiazol-2-one (7.5 g.), melting at 136° C. after a first fusion at 124–125° C., is obtained.

Following the same procedure and using appropriate amines of general formula IV and acid halides of general formula V as starting materials, the following products are obtained:

3-[2,4-dichloro-5-(1-ethylcarbamoyl-ethoxy)-phenyl]-5-t-butyl-1,3,4-oxadiazol-2-one, m.p. 178° C.;
3-[2,4-dichloro-5-(1-allylcarbamoyl-ethoxy)-phenyl]-5-t-butyl-1,3,4-oxadiazol-2-one, m.p. 152–153° C.;
3-[2,4-dichloro-5-(1-dimethylcarbamoyl-ethoxy)-phenyl]-5-ethyl-1,3,4-oxadiazol-2-one, m.p. 126° C.;
3-[2-chloro-5-(1-dimethylcarbamoyl-ethoxy)-phenyl]-5-t-butyl-1,3,4-oxadiazol-2-one, m.p. 141° C.;
3-(2,4-dichloro-5-dimethylcarbamoylmethoxy-phenyl)-5-t-butyl-1,3,4-oxadiazol-2-one, m.p. 135° and then 143° C.;
3-[2,4-dichloro-5-(1-dimethylcarbamoyl-ethoxy)-phenyl]-5-isopropyl-1,3,4-oxadiazol-2-one, m.p. 95° C., and
3-[2-chloro-4-methyl-5-(1-dimethylcarbamoyl-ethoxy)-phenyl]-5-t-butyl-1,3,4-oxadiazol-2-one, m.p. 136° C.

EXAMPLE 7

A mixture of 3-(2,4-dichloro-5-hydroxy-phenyl)-5-cyclopropyl-1,3,4-oxadiazol - 2 - one (40 g.), methyl 2-bromo-propionate (16.4 g.), sodium iodide (1.05 g.) and potassium carbonate (19.3 g.) in acetonitrile (200 cc.) is heated under reflux, with stirring, for 6 hours. After cooling, the inorganic salts are filtered off and the organic solution is concentrated to dryness under reduced pressure (20 mm. Hg) at 50° C. The residue is taken up in methylene chloride (400 cc.) and the methylene chloride solution is washed with water (3×200 cc.). After drying over sodium sulphate, the solvent is evaporated under reduced pressure (20 mm. Hg) at 50° C. and the residue is then recrystallised from isopropanol to yield 3-[2,4-dichloro-5-(1-methoxy-carbonyl - ethoxy) - phenyl] - 5-cyclopropyl-1,3,4-oxadiazol-2-one (25.3 g.) melting at 114° C.

3-(2,4-Dichloro-5-hydroxy-phenyl) - 5 - cyclopropyl-1,3,4-oxadiazol-2-one employed as starting material can be prepared in the following manner:

3-(2,4-Dichloro-5-isopropoxy-phenyl) - 5 - cyclopropyl-1,3,4-oxadiazol-2-one (53.4 g.) is introduced, over the course of 5 minutes and with stirring, into concentrated sulphuric acid ($d=1.83$; 106 cc.) kept at 20° C. Stirring is continued for 1 hour at 20°C. and the solution obtained is then poured onto a mixture of crushed ice (370 g.) and methylene chloride (370 cc.). After filtering off a small amount of insoluble material, the organic phase is decanted and the aqueous phase is extracted with methylene chloride (2 × 100 cc.). The combined methylene chloride extracts are washed successively with water (150 cc.), a 10% (w./v.) solution of potassium bicarbonate (150 cc.) and water (150 cc.). After drying over sodium sulphate, the solvent is driven off under reduced pressure (20 mm. Hg) at 50° C. and the residual solid is recrystallised from heptane. 3 - (2,4-Dichloro-5-hydroxy-phenyl)-5-cyclopropyl-1,3,4-oxadiazol-2-one (40 g.), melting at 112° C., is thus obtained.

3-(2,4-Dichloro - 5 - isopropoxy-phenyl)-5-cyclopropyl-1,3,4-oxadiazol-2-one (m.p. 135° C.) employed as starting material can be prepared by cyclisation, using phosgene, of 1-cyclopropylcarbonyl-2-(2,4-dichloro-5-isopropoxy-phenyl)-hydrazine in refluxing toluene.

1 - Cyclopropylcarbonyl-2-(2,4-dichloro-5-isopropoxyphenyl)-hydrazine (m.p. 156° C.) can be prepared by reacting cyclopropylcarbonyl chloride with 2,4-dichloro-5-isopropoxyphenyl-hydrazine in benzene in the presence of triethylamine.

2,4-Dichloro - 5 - isopropoxyphenyl-hydrazine (m.p. 71° C.) can be prepared from 2,4-dichloro-5-isopropoxyaniline by diazotisation followed by reduction of the diazonium salt by stannous chloride.

2,4-Dichloro - 5-isopropoxyaniline (b.p. 110–112° C./0.2 mm. Hg; solidification point 39–40° C.) can be prepared by reduction of the corresponding nitro derivative with iron in aqueous ethanol.

2,4-Dichloro-5-isopropoxy-nitrobenzene (m.p. 46° C.) can be prepared by condensation of isopropylbromide with 2,4-dichloro-5-nitrophenol in refluxing acetonitrile in the presence of potassium carbonate.

EXAMPLE 8

A solution (47 cc.) of dimethylamine in benzene (92.4 g. of dimethylamine per litre) is added, over the course of 15 minutes, at about 20° C. and with stirring, to a solution of 3-[2,4-dichloro-5-(1-chlorocarbonyl-ethoxy)-phenyl]-5-cyclopropyl-1,3,4-oxadiazol-2-one (16.4 g.) in anhydrous benzene (192 cc.). After being left overnight, water (150 cc.) is poured into the reaction mixture. The mixture is stirred for 10 minutes, and the organic layer is then decanted, washed successively with a 10% (w./v.) solution of potassium bicarbonate (150 cc.) and water (150 cc.). After drying over sodium sulphate, the solvent is evaporated under reduced pressure (20 mm. Hg) at 50° C. and the residual solid is recrystallised from ethanol and then from acetone. 3-[2,4-Dichloro-5-(1-dimethylcarbamoyl-ethoxy)-phenyl]-5-cyclopropyl - 1,3,4 - oxadiazol-2-one (7.95 g.), melting at 160° C., is thus obtained.

3-[2,4-Dichloro - 5 - (1-chlorocarbonyl-ethoxy)-phenyl]-5-cyclopropyl-1,3,4-oxadiazol-2-one employed as starting material can be prepared in the following manner:

A solution of 3-[2,4-dichloro-5-(1-carboxy-ethoxy)-phenyl]-5-cyclopropyl - 1,3,4 - oxadiazol-2-one (17.3 g.) and thionyl chloride (8.5 g.) in chloroform (173 cc.) is heated under reflux until the evolution of gas ceases, and the solvent is then driven off under reduced pressure (20 mm. Hg) at 60° C. 3-[2,4-Dichloro-5-(1-chlorocarbonyl-ethoxy)-phenyl]-5-cyclopropyl - 1,3,4 - oxadiazol - 2 - one (16.4 g.) in the form of a viscous oil is thus obtained.

3-[2,4-Dichloro - 5 - (1-carboxy-ethoxy)-phenyl]-5-cyclopropyl-1,3,4-oxadiazol-2-one can be prepared by the procedure described in the next following Example.

EXAMPLE 9

A solution of 3-[2,4-dichloro-5-(1-methoxycarbonyl-ethoxy)-phenyl] - 5 - cyclopropyl - 1,3,4 - oxadiazol-2-one (20 g.), hydrochloric acid ($d=1.18$; 43 cc.) and dioxan (400 cc.) is heated at 80° C. for 24 hours. After cooling, the solution is poured into water (2 litres). The precipitate which appears is filtered off, washed with water (2× 100 cc.) and then added to a 10% (w./v.) solution of potassium bicarbonate (260 cc.). The solution is stirred for 20 minutes, the insoluble material is filtered off, and then the filtrate is acidified by adding hydrochloric acid ($d=1.18$; 22 cc.). The product which separates is extracted with methylene chloride (200 cc.), and the methylene chloride solution is washed with water (100 cc.). After drying over sodium sulphate, the solvent is driven off under reduced pressure (20 mm. Hg) at 55° C. to yield 3-[2,4-dichloro - 5 - (1-carboxy-ethoxy)-phenyl]-5-cyclopropyl-1,3,4-oxadiazol-2-one (17.3 g.) in the form of a glassy mass which crystallises slowly (m.p.=126–127° C.).

EXAMPLE 10

O,N-Dimethylhydroxylamine (2.75 g.) is added, at about 20° C. and with stirring, to 3-[2,4-dichloro-5-(1-chlorocarbonyl-ethoxy)-phenyl] - 5 - t-butyl-1,3,4-oxadiazol -2- one (17.7 g.) and triethylamine (6.3 cc.) in anhydrous benzene (180 cc.). Stirring is continued for a further 2 hours and water (100 cc.) is then added to the reaction mixture. After stirring for 10 minutes, the organic phase is decanted, washed successively with a 10% (w./v.) solution of potassium bicarbonate (100 cc.) and water (100 cc.), dried over sodium sulphate and then concentrated to dryness under reduced pressure (20 mm. Hg) at 50° C. The residue is purified by recrystallisation from cyclohexane, chromatography on "Florisil," eluting with a benzene/chloroform mixture (9/1 by volume), and finally recrystallisation from cyclohexane. 3-[2,4-Dichloro-5-(1-N - methoxy - N - methylcarbamoyl-ethoxy)-phenyl]-5-t-butyl-1,3,4-oxadiazol-2-one (11.5 g.), melting at 124° C., is thus obtained.

3-[2,4-Dichloro - 5 - (1-chlorocarbonyl-ethoxy)-phenyl]-5-t-butyl-1,3,4-oxadiazol-2-one employed as starting material can be prepared from the corresponding acid. Starting with 3-[2,4-dichloro-5-(1-carboxy-ethoxy)-phenyl]-5-t-butyl-1,3,4-oxadiazol-2-one (16.95 g.), thionyl chloride (8 g.) and chloroform (170 cc.), 3-[2,4-dichloro-5-(1-chlorocarbonyl-ethoxy)-phenyl] - 5 - t - butyl-1,3,4-oxadiazol-2-one (17.7 g.) is obtained in the form of a viscous oil.

EXAMPLE 11

Following the procedure of Example 10 but starting with 3-[2 - chloro-4-methyl-5-(1-chlorocarbonyl-ethoxy)-phenyl]-5-t-butyl-1,3,4-oxadiazol-2-one (8.4 g.) and O,N-dimethylhydroxylamine (1.37 g.), 3-[2-chloro-4-methyl-5-(1-N-methoxy - N - methylcarbamoyl-ethoxy)-phenyl]-5-t-butyl-1,3,4-oxadiazol-2-one (4.25 g.), melting at 115° C. after recrystallisation from heptane, is obtained.

EXAMPLE 12

Following the procedure of Example 1 but starting with 3-(2,4-dichloro - 5 - hydroxyphenyl)-5-t-butyl-1,3,4-oxadiazol-2-one (15.1 g.) and 1-methoxy-2-bromopropane (8.5 g.) [prepared according to Peterson and Slama, J. Org. Chem. 35, 530 (1970)], 3-[2,4-dichloro-5-(1-methoxymethyl-ethoxy)-phenyl] - 5 - t-butyl-1,3,4-oxadiazol-2-one is obtained in the form of a viscous oil.

Analysis.—Calculated (percent): N, 7.47; Cl, 18.90. Found (percent): N, 7.6; Cl, 19.55.

The following Examples illustrate herbicidal compositions according to the invention:

EXAMPLE 13

100 g. of wetting agent obtained by the condensation of ethylene oxide (10 moles) with octylphenol (1 mole)

are added to 1,000 g. of 3-[2,4-dichloro-5-(1-methoxycarbonyl-ethoxy)-phenyl] - 5 - t - butyl-1,3,4-oxadiazol-2-one. This mixture is then dissolved in a mixture of equal volumes of acetophenone and toluene. The volume of the solution is made up to 2,000 cc. with the same solvent mixture. This solution, after dilution to 1,000 litres with water, can be used to combat, for example, foxtail in wheat. The dilute solution obtained is sufficient to treat one hectare of crop area.

EXAMPLE 14

Following the procedure of Example 13 but using 3-[2, 4 - dichloro - 5-(1-hydroxymethyl-ethoxy)-phenyl]-5-t-butyl - 1,3,4 - oxadiazol-2-one, a composition is obtained which is suitable for combatting grasses.

EXAMPLE 15

A wettable powder, containing 50% of active product, is prepared by the following procedure:

1 part of Tween 80 (the mono-oleate of a polyoxyethylene derivative of sorbitol), 20 parts of calcium lignosulphite and 29 parts of kieselguhr 23 are added to 50 parts of 3 - [2,4 - dichloro-5-(1-carboxyethoxy)-phenyl]-5-t-butyl-1,3,4-oxadiazol-2-one. After grinding and sieving, the powder obtained is used, after it has been diluted with water, to destroy weeds.

It is to be understood that in this specification and accompanying claims carbon atoms in alkyl, alkoxy and alkenyl radicals within the definitions of symbols R, $R_1$, $R_2$, $R_3$, $R_5$ and $R_6$, or alkoxycarbonyl or alkoxymethyl groups within the definition of symbol $R_4$, may be in a straight chain or branched chain.

I claim:
1. An oxadiazolone derivative of the formula:

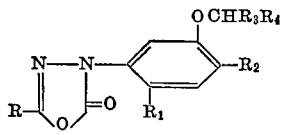

wherein R represents alkyl of 1 through 4 carbon atoms or cycloalkyl of 3 through 6 carbon atoms, $R_1$ and $R_2$ each represent hydrogen or halogen, or alkyl of 1 through 4 carbon atoms, $R_3$ represents hydrogen, or alkyl of 1 through 4 carbon atoms or alkoxy of 1 through 4 carbon atoms, and $R_4$ represents carboxy, alkoxycarbonyl in which the alkyl moiety contains 1 through 4 carbon atoms, hydroxymethyl, alkoxymethyl in which the alkyl moiety contains 1 through 4 carbon atoms, or a carbamoyl group —$CONR_5R_6$, in which $R_5$ represents hydrogen, alkyl of 1 through 4 carbon atoms, alkenyl of 2 through 4 carbon atoms or alkoxy 1 through 4 carbon atoms, and $R_6$ represents hydrogen, alkyl of 1 through 4 carbon atoms or alkenyl of 2 through 4 carbon atoms.

2. An oxadiazolone derivative according to claim 1 wherein R represents alkyl of 1 through 4 carbon atoms, $R_4$ represents carboxy, alkoxycarbonyl in which the alkyl wherein R represents alkyl of 1 through 4 carbon atoms, methyl, alkoxymethyl in which the alkyl moiety contains 1 through 4 carbon atoms, carbamoyl, monoalkylcarbamoyl or dialkylcarbamoyl in which the alkyl radical(s) contain 1 through 4 carbon atoms, or monoalkenylcarbamoyl or dialkenylcarbamoyl in which the alkenyl radical(s) contain 2 through 4 carbon atoms, and $R_1$, $R_2$ and $R_3$ are as defined in claim 1.

3. An oxadiazolone derivative according to claim 1 wherein R represents t-butyl, $R_1$ and $R_2$ each represent halogen, $R_3$ represents alkyl of 1 through 4 carbon atoms, and $R_4$ represents carboxy, alkoxycarbonyl in which the alkyl moiety contains 1 through 4 carbon atoms, hydroxymethyl, alkoxymethyl in which the alkyl moiety contains 1 through 4 carbon atoms, or a carbamoyl group

—$CONR_5R_6$, in which $R_5$ represents alkyl of 1 through 4 carbon atoms or alkoxy of 1 through 4 carbon atoms, and $R_6$ represents hydrogen or alkyl of 1 through 4 carbon atoms.

4. An oxadiazolone derivative according to claim 1 wherein either or both of $R_1$ and $R_2$ represents a chlorine atom.

5. An oxadiazolone derivative according to claim 1 wherein $R_3$ represents a methyl radical.

6. The oxadiazolone derivative according to claim 1 which is 3-[2,4-dichloro-5-(1-carboxy-ethoxy)-phenyl]-5-t-butyl-1,3,4-oxadiazol-2-one.

7. The oxadiazolone derivative according to claim 1 which is 3 - [2,4-dichloro - 5 - (1-hydroxymethyl-ethoxy)-phenyl]-5-t-butyl-1,3,4-oxadiazol-2-one.

8. The oxadiazolone derivative according to claim 1 which is 3-[2,4-dichloro-5-(1-dimethylcarbamoylethoxy)-phenyl]-5-t-butyl-1,3,4-oxadiazol-2-one.

9. The oxadiazolone derivative according to claim 1 which is 3 - [2,4 - dichloro-5-(1-N-methoxy-N-methylcarbamoyl - ethoxy)-phenyl]-5-t-butyl-1,3,4-oxadiazol-2-one.

References Cited
UNITED STATES PATENTS

| | | | |
|---|---|---|---|
| 2,264,436 | 12/1941 | Engel et al. | 260—307 |
| 3,337,575 | 8/1967 | Boesch et al. | 260—307 |
| 3,385,862 | 5/1968 | Metivier et al. | 260—307 |
| 3,410,863 | 11/1968 | Boesch et al. | 260—307 |
| 3,741,977 | 6/1973 | Boesch | 260—307 A |

G. THOMAS TODD, Primary Examiner

U.S. Cl. X.R.

260—562 H; 71—92

UNITED STATES PATENT OFFICE
CERTIFICATE OF CORRECTION

Patent No. 3,836,539           Dated September 17, 1974

Inventor(s) ROGER BOESCH

It is certified that error appears in the above-identified patent and that said Letters Patent are hereby corrected as shown below:

In the heading, the name of the Assignee should be changed from "Rhone-Poulence S.A." to --Rhone-Poulenc S.A.--;

after "Claims priority, application France, Sept. 9, 1971, 7132587" insert --and application France, July 5, 1972, 72,24327--.

Signed and sealed this 14th day of January 1975.

(SEAL)
Attest:

McCOY M. GIBSON JR.
  Attesting Officer

C. MARSHALL DANN
  Commissioner of Patents